Sept. 22, 1964     R. J. CLEMENTS ETAL     3,149,683
GEOPHYSICAL PROSPECTING APPARATUS Filed Aug. 13, 1957                                  4 Sheets-Sheet 1

Sept. 22, 1964   R. J. CLEMENTS ETAL   3,149,683
GEOPHYSICAL PROSPECTING APPARATUS
Filed Aug. 13, 1957   4 Sheets-Sheet 2

Fig.2.

Sept. 22, 1964  R. J. CLEMENTS ETAL  3,149,683
GEOPHYSICAL PROSPECTING APPARATUS
Filed Aug. 13, 1957  4 Sheets-Sheet 3

United States Patent Office 3,149,683
Patented Sept. 22, 1964

3,149,683
GEOPHYSICAL PROSPECTING APPARATUS
Roy J. Clements, Bellaire, Burton D. Lee, Houston, and Roland B. Stelzer, Bellaire, Tex., assignors to Texaco Inc., a corporation of Delaware
Filed Aug. 13, 1957, Ser. No. 677,969
30 Claims. (Cl. 175—50)

This invention relates to a method and apparatus for geophysical prospecting and more particularly to a method and apparatus for simultaneously drilling and logging a borehole.

In the conventional method of logging a borehole the log is obtained while the drilling operation is periodically interrupted, during which period the drill pipe is removed and a logging instrument suspended by a steel shrouded multi-conductor electrical cable is lowered into the borehole. As the instrument penetrates different geological strata information in the form of electrical signals is transmitted from the bottom of the borehole to the surface through the conductor cable where it is recorded on a chart.

These are several disadvantages in using the conventional logging method. An important disadvantage is that the drilling rig must be idle while the logging crew takes over the borehole. Furthermore during the drilling operation the drilling fluid in the borehole invades the formation around the borehole changing the electrical characteristic of the formation. Invasion is progressive with time and may sufficiently contaminate the formation to confuse the interpretation of logs which are obtained at a considerable time after the mud begins to invade the formations. Depth control to a certain formation is difficult in that the desired strata may have been drilled through before a log is run.

It has been found that many of these disadvantages may be eliminated or mitigated by simultaneously logging and drilling. In an effort to achieve the objective of logging while drilling several preliminary attempts have been made. One of the oldest methods of logging while drilling has been to observe the cuttings in the drill mud as they come to the surface. However, this method has proved to be unsatisfactory since it has been found that the cuttings of the various formations are intermixed and are greatly diluted by the mud which carries them to the surface where they are examined.

Another method of logging while drilling attempts to overcome the important problem of transmission of information to the surface by utilizing a fabricated drill pipe having two conductors throughout each joint which are terminated in spring loaded pin and socket connections. When the drill string is made up these connections are engaged and thereby effect a 2-wire-line transmission system between the subsurface and surface equipment. This transmission system has been found to be impractical due to the time required to make the electrical connections at each pipe joint and to the lack of electrical and mechanical reliability and durability thereof.

Another logging while drilling system utilizes electromagnetic couplings between joints. This proposed transmission system consists of a large number of transformers in cascade to effect communication between the surface and subsurface equipment. The physical installation requires the placement of a coil of wire at each end of each joint of the drill pipe. The coils are connected together by a 2-wire cable within each length of drill pipe. When the drill string is made up, pairs of coils come into proximity providing electromagnetic coupling between joints. Due to the loss of energy at each coupling this type of transmission system should include a number of booster or repeater stations. The frequency replacement of energy sources at these booster stations ascribes to this method of signal transmission disadvantages that are associated with making direct manual connections at each joint. A system which utilizes electromagnetic couplings is disclosed in U.S. Patent No. 2,379,800 granted to D. G. C. Hare on July 3, 1945.

Still another method of logging while drilling employs an electrical transmission system from the subsurface to the surface equipment which utilizes the steel drill pipe as one conductor and the second conductor is provided by installing an insulated conductor in the center portion of the drill pipe. The means of coupling the second conductor from the bottom of one joint to the top of the next involves the fitting of a probe into a cup or vial of mercury. The disadvantage of this method however is in the fact that the center of the pipe is no longer available for special purpose equipment that is often used in the process of drilling and therefore this arrangement is also considered impractical.

In order to overcome the disadvantages encountered in the prior art methods, a method of geophysical prospecting in accordance with this invention is provided which comprises drilling a borehole, simultaneously and continuously detecting a physical variable in the hole, simultaneously and continuously recording in the hole the physical variable and simultaneously and continuously recording the depth in the hole at which the physical variable is being detected. The method of this invention utilizes a device for logging a subsurface physical variable or parameter while drilling a bore hole through the earth's formations which comprises a tubular member or housing adapted to be inserted in a conventional drill stem or string, a sealed container or pressure-tight capsule disposed within and secured to the housing and adapted and arranged to permit the passage of fluid through the housing, means disposed at least in part within the capsule for continuously detecting values of the parameter and means disposed within the capsule for continuously recording these values.

In order that the invention may be more clearly understood and readily carried into effect it will now be described more fully with reference to the accompanying drawing in which:

FIG. 1 illustrates the lower or bit end of a rotary drill stem or string of the geophysical prospecting apparatus in accordance with the invention;

FIG. 3 is a more detailed circuit diagram of the logging equipment illustrated in FIG. 2;

FIG. 6 is a diagram of a sensitive lamp circuit which may be substituted for a galvanometer of the oscillograph shown in FIGS. 3 and 5; and FIG. 7 is a diagram of a magnetic tape recorder which may be substituted for the oscillograph shown in FIGS. 3 and 5.

Figures 1, 5:
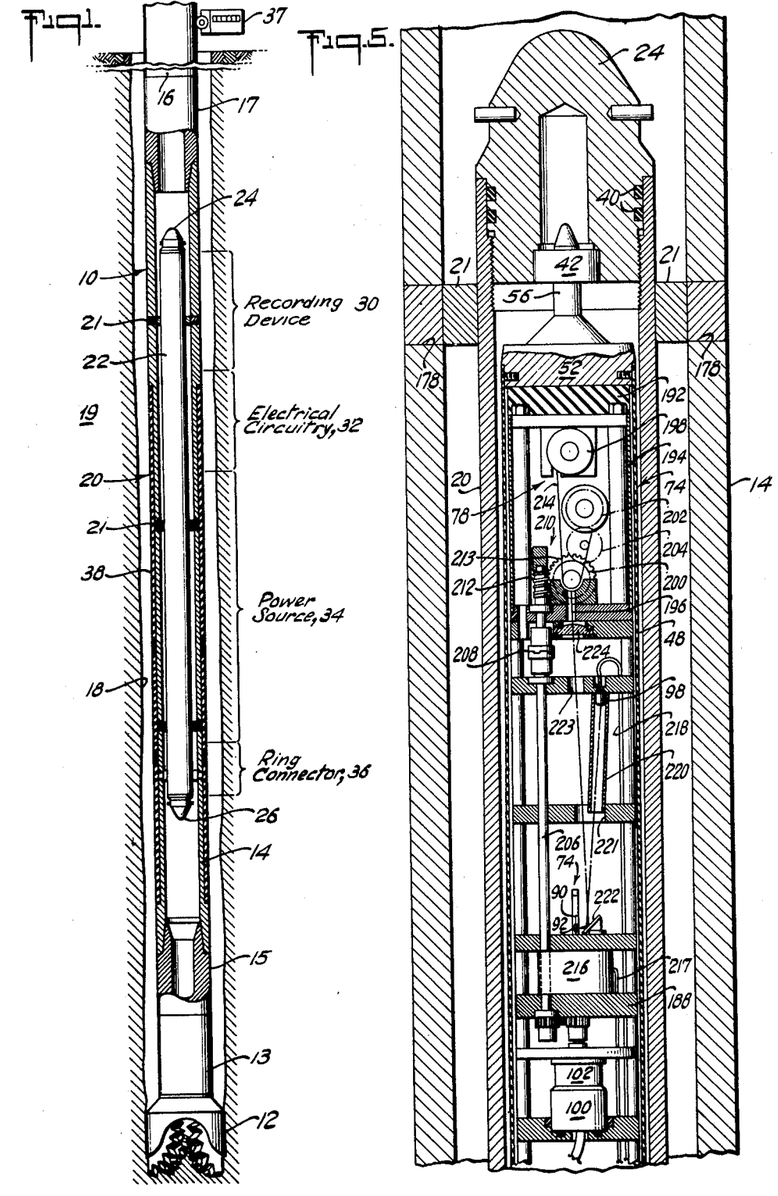
Figures 5, 6, 7:
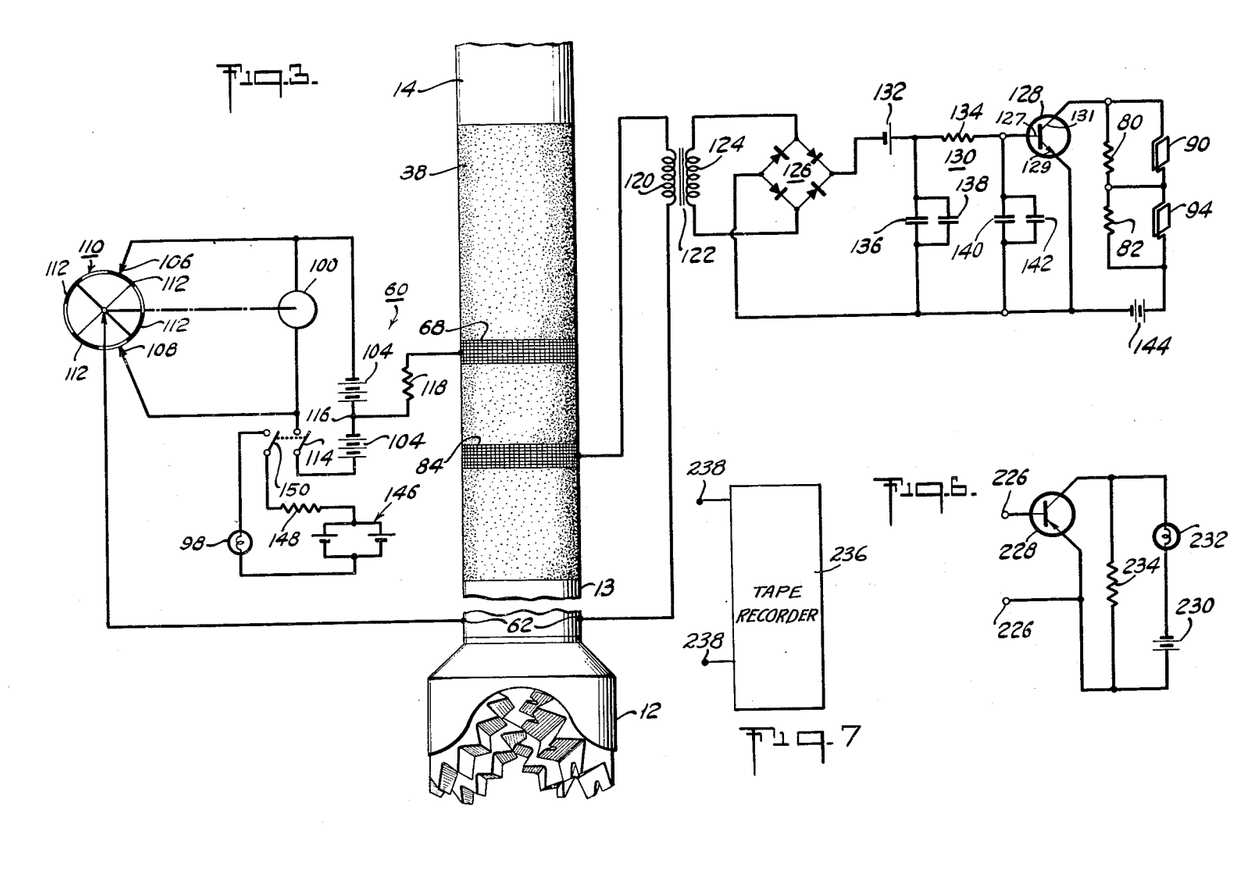

Referring to the drawings in more detail wherein like elements have the same reference numerals, there is shown in FIG. 1 the lower portion of a drill stem or string 10 including a drill bit 12, a conventional sub 13 which is connected to the bit 12, a tubular housing or pipe 14, a bottom adapter or connector sub 15 connecting the conventional sub 13 to the housing 14, a conventional drill collar 16 and a top adapter or connector sub 17 connecting the housing 14 to the collar 16, disposed in the borehole 18 which traverses one or more formations of the earth 19. A sealed container or capsule 20 adapted to withstand pressures of 14,000 lbs. per sq. in. is disposed coaxially within the housing 14 and is rigidly secured thereto by bosses or studs 21. The capsule 20 includes a hollow cylinder 22 and top and bottom caps 24 and 26 respectively. Within the capsule 20 there is contained electrical logging equipment, shown diagrammatically in FIG. 2, including a recording device, preferably an oscillograph 28, but which alternatively may be a suitable magnetic recording device as illustrated in FIG. 7, housed in section 30 of the capsule 20, electrical circuitry comprising current generating and signal detecting circuits housed in section 32, a power source comprising a plurality of voltaic cells housed in section 34 and ring connectors housed in section 36. At the surface of the earth 19 there is shown a device 37 in contact with the drill string 10 for continuously recording the depth of the drill bit 12 in the borehole 18 against time, which may be of a type similar to that disclosed in U.S. Patent 2,539,758. A substantial portion of the outer surface of the housing 14 is covered with a layer of insulating material 38, described more fully hereinafter.

Figure 2:
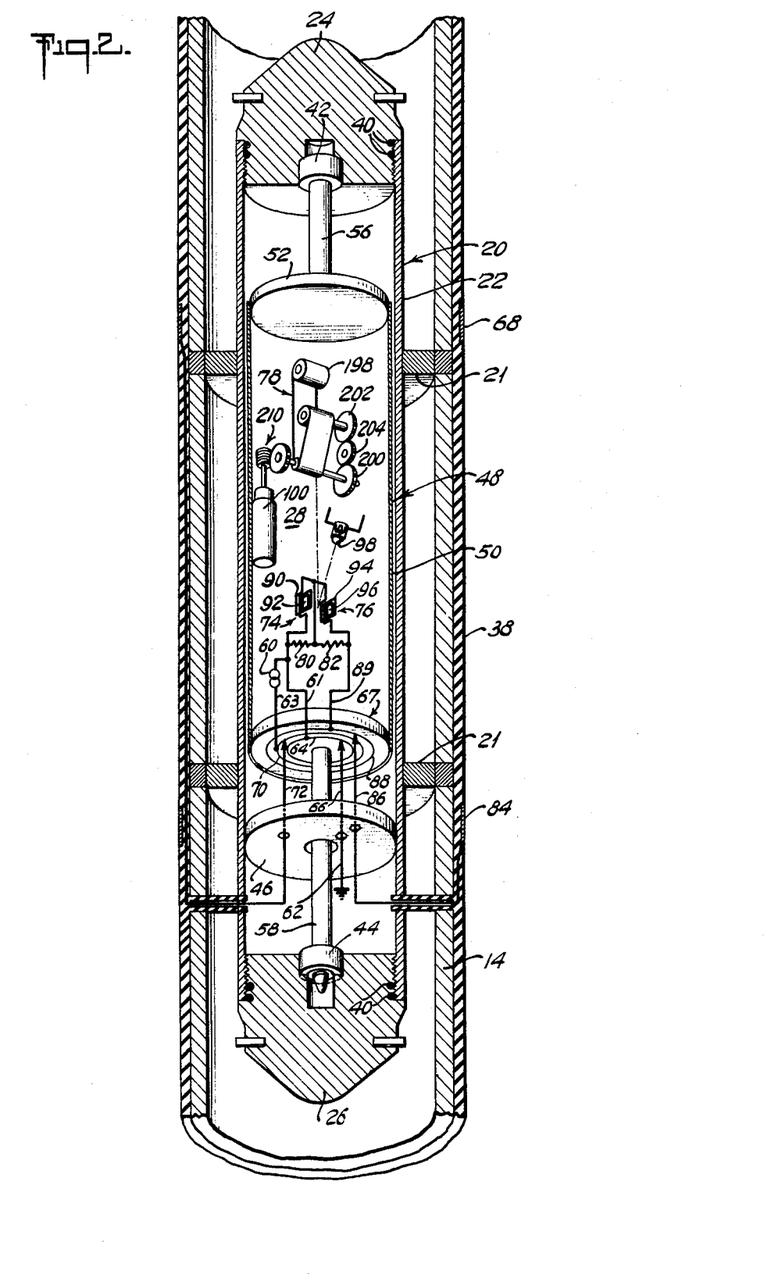
FIG. 2 illustrates the portion of the drill stem shown in FIG. 1, which contains electrical logging equipment in accordance with the invention.
Figure 4:
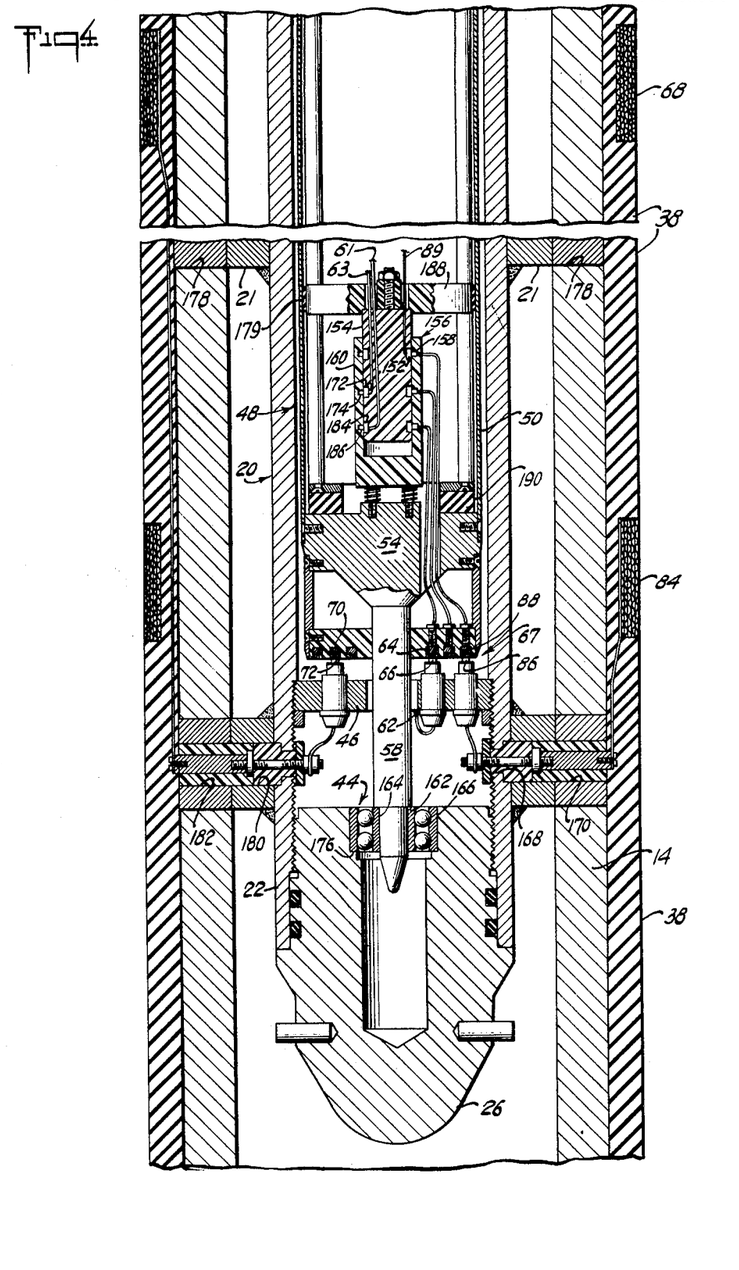
FIG. 4 is a longitudinal sectional view of the portion of the drill stem wherein electrical connections from within a closed case are made to external electrodes on FIG. 5 is a schematic view of the oscillograph of the logging equipment disposed in the drill stem.

As shown in FIG. 2, the top and bottom caps 24 and 26, respectively, of the capsule 20 threadedly engage the cylinder 22, preferably cap 24 having a left-hand thread and cap 26 having a right-hand thread. O-rings 40 are located between the caps 24, 26 and the cylinder 22 to provide effective pressure seals for the capsule 20. Disposed in the top and bottom caps 24 and 26 along the axis of the cylinder 22 are thrust bearings 42 and 44 respectively. Within the capsule 20 is a stationary disk 46 which is preferably threadedly engaged to the cylinder 22 as shown in FIG. 4. Disposed within the pressure-tight capsule 20 is an inner case or instrument container 48 including a cylinder 50 and upper and lower end-plates 52 and 54 having support shafts 56 and 58 respectively, end-plates 54 and 52 being clearly shown in FIGS. 4 and 5, respectively. The shafts 56 and 58 are disposed along the axis of the inner case 48 and engage the thrust bearings 42 and 44, respectively, in the caps 24, 26 to substantially isolate the inner case 48 from torsional forces applied, generally at the earth's surface, to the drill stem 10 due to the rotatability of the inner case 48 inside of the capsule 20.

The inner case 48 contains the electrical logging equipment which includes the oscillograph 30, the electrical circuitry 32, power source 34 and the ring connectors 36. More particularly, the inner case 48 contains a generator 60 for supplying alternating current to the formations traversed by the borehole 18. One terminal of the generator 60 is connected via a first lead 61 to a common electrical point 62, which may be any convenient point effectively on the drill stem 10, through a first collector ring 64 and brush 66 of a collector ring connector 67 and the other terminal of the generator 60 is connected via a second lead 63 to an external current electrode 68, disposed substantially midway between the ends of the insulating layer 38, through a second collector ring 70 and brush 72 of the collector ring connector 67. The external current electrode 68 is imbedded in the insulating layer 38 so as to be insulated from the tubular housing 14. Also provided within the inner case 48 is the oscillograph 28 including first and second D'Arsonval-type galvanometers 74 and 76 respectively, and a camera 78. The galvanometers 74 and 76 are responsive to voltages developed across series resistors 80 and 82, respectively, of unequal resistance values which are effectively connected between the common point 62 and an external potential electrode 84, which is spaced, preferably 18", from current electrode 68 and also insulated from the tubular housing 14 by the insulating material 38. The potential electrode 84 is connected to series resistances 80 and 82 through a third brush 86 and collector ring 88 of the collector ring connector 67 and a third lead 89. Galvanometer 74 comprises a coil 90 and a mirror 92 attached thereto and galvanometer 76 comprises a second coil 94 and a second mirror 96 attached thereto.

A common light source, for example, a lamp 98, provides a light beam for both galvanometers 74 and 76. A suitable constant speed motor 100 is coupled to the camera 78 through gear train 102. The disk 46 supports the brushes 66, 72 and 86 and is disposed between the bottom cap 26 of the capsule 20 and the cylinder 50 of the inner case 48 to permit brushes 66, 72 and 86 to engage collector rings 64, 70 and 88, respectively. The disk 46 has a centrally disposed opening through which lower shaft 58 of the inner case 48 may freely pass.

Referring to FIG. 3 of the drawing there is shown the electrical circuit of the electrical logging equipment. This figure shows in more detail the alternating current generator 60 which includes a battery 104, preferably composed of a plurality of mercury cells, connected between first and second brushes 106 and 108 respectively of a commutator 110 having four interconnected copper segments 112 connected to the common point 62, a first switch 114 being interposed between one terminal of battery 104 and the second brush 108. The motor 100 is connected across battery 104 via the switch 114 and is coupled to drive commutator 110. The mid-point 116 of battery 104 is connected to the current electrode 68 via a resistor 118 which has a high resistance value compared with the resistance of the earth's formations in order to supply a substantially constant current to the formations.

The external potential electrode 84 is connected to one terminal of the primary winding 120 of a transformer 122, the other terminal of the primary winding 120 being connected to the common point 62. The secondary winding 124 of the transformer 122 is connected between two terminals of a bridge rectifier 126, which preferably utilizes silicon diodes. A filter 130 is connected between the other two terminals or output of the bridge rectifier 126, the output of the filter 130 being connected between the base and emitter electrodes 127, 129 of a transistor 128, for example, an NPN silicon transistor. A bias battery 132 is connected between one of the output terminals of bridge rectifier 126 and the base of transistor 128 to eliminate non-linearity at low input levels. The filter 130 which is provided to smooth out the rectified voltage from the output of bridge rectifier 126 comprises a first resistor 134 connected between the bias battery 132 and the base of the transistor 128, a first pair of parallel connected capacitors 136, 138 connected across the output of the bridge rectifier 126 and a second pair of parallel connected capacitors 140, 142 connected across the output of the bridge rectifier 126 through resistor 134. Series resistors 80 and 82 are connected between the collector and emitter electrodes 131, 129 of transistor 128 through the collector supply battery 144. The coil 90 of the first galvanometer 74 is connected across one of the two series resistors 80 and the coil 94 of the second galvanometer 76 is connected across the other of the two series resistors 82. The galvanometer lamp 98, for example, a conventional surgical lamp, is connected to battery 146 through a voltage reducing resistor 148 and a second switch 150, which is preferably mechanically coupled to the first switch 114 to operate simultaneously therewith.

To provide an electrical or resistivity log as in the disclosed embodiment of the invention, at least two electrodes must be electrically connected to two spaced points in the earth's formations. In the apparatus of this invention, one of the electrodes may conveniently be the drill stem 10 and therefore at least one additional electrode must be insulated from the drill stem 10. In the disclosed embodiment of the invention two additional electrodes, the current electrode 68 and the potential electrode 84, are used which are insulated from the drill stem 10 or common electrode 62 by the insulation 38. FIG. 4 shows the electrical connections from the circuitry contained in the inner case 48 to the current and potential electrodes 68, 84 respectively, mounted on the external surface of the tubular housing 14. The potential lead 89 from the oscillograph 28 is connected to the external potential electrode 84 through a conductor 152 in the male element 154 and a conductor 158 in the female element 160 of the slip ring connector 156, the collector ring 88 and brush 86 of collector ring connector 67 and suitably insulated openings 168 and 170 in the capsule 20 and the housing 14, respectively. The current lead 63 from the generator 60 is connected to the external current electrode 68 through a conductor 172 in the male element 154 and a conductor 174 in the female element 160 of the slip ring connector 156, the collector ring 70 and brush 72 of the collector ring connector 67 and suitably insulated openings 180 and 182 in the capsule 20 and the housing 14, respectively. The common lead 61 is connected to the common point or ground 62 through a conductor 184 in the male element 154 and a conductor 186 in the female element 160 of the slip ring connector 156, of the collector ring 64 and brush 66 of the collector ring connector 67. As shown in FIG. 4 the common point or electrode 62 can be a point on the disc 46 since the disc 46 is substantially at the same electrical potential as is the drill stem 10 due to the metallic connections therebetween. As can be clearly seen in FIG. 4 the male element 154 of slip ring connector 156 is rigidly connected to a frame 188 which is adapted to be inserted into the inner case 48 and the female element 160 of the slip ring connector 156 is attached to the end plate 54 of the capsule 48.

In addition to providing a detailed view of the electrical connections from the inner case 48 through the capsule 20 and the housing 14, FIG. 4 also shows the arrangement between the lower support shaft 58 of the inner case 48 and the thrust bearing 44 which is mounted in a recess in bottom cap 26 of the capsule 20. The bearing 44 is essentially a ball bearing having an inner race 162 upon which a shoulder 164 of the shaft 58 is seated and an outer race 166 which is seated upon a shoulder 176 of the bottom cap 26. The upper support shaft 56 of the inner case 48 is similarly connected to the top cap 24 of the capsule 20 by thrust bearing 42, as shown in FIGS. 2 and 5.

Also shown in FIG. 4 is the rigid mechanical connection between the capsule 20 and the housing 14. In order to provide the rigid connection a number of holes or openings 178 are drilled through the housing 14 at spaced points, a like number of studs or bosses 21 are welded to the outside surface of the capsule 20, the capsule 20 with the welded studs 21 is inserted into the housing 14, the studs 21 are aligned with the openings 178 and the studs 21 are then welded to the housing 14.

The frame 188 which, as mentioned, above, is adapted to slide into the inner case 48 and to which the relatively sensitive logging equipment is directly attached is provided with a shock absorbing material 179, for example, a rubber-like material, preferably neoprene. This shock absorbing material 179 is applied to the outer surfaces or periphery of the frame 188 to be disposed between the frame 188 and the cylinder 50 of the inner case 48 when the frame 188 is disposed in the inner case 48, whereby the frame 188 is protected from horizontal or transverse shock or vibration to which the drill stem 10 may be subjected during the course of drilling. In order to protect the frame 188 and the logging equipment from vertical shock and vibration shock-absorbing material, such as a first rubber cushion 190 is disposed between the lower end of the frame 188 and the lower end-plate 54 of inner case 48 and a second rubber cushion 192 is disposed between the camera 78 which is attached to the upper end of the frame 188 and the upper end-plate 52 of the inner case 48, as shown in FIGS. 4 and 5, respectively.

The oscillograph 28 of the logging equipment shown diagrammatically in FIG. 5, comprises essentially the camera 78 and the galvanometers 74 and 76, only galvanometer 74 being shown in FIG. 5 for the sake of clarity. The camera 78 comprises a cylindrical housing 194 having a slit or opening 196 at one end thereof, a film supply spool 198, for example, a conventional 35-mm. cassette, a film sprocket 200, a take-up spool 202 and an idle wheel 204 interposed between the film sprocket 200 and the take-up spool 202. The film sprocket 200 is driven by the motor 100 through suitable reduction gears 102, a shaft 206, a clutch 208 and a worm gear 210 comprising a worm 212 and a worm wheel 213 rigidly secured to the film sprocket 200. The clutch 208 is preferably a disengageable multijaw coupling having one-half thereof rigidly connected to shaft 206, the other half thereof being rigidly connected to the worm 212 of the worm gear 210 disposed in the camera 78. In order to provide a tightly wound film on the take-up spool 202, take-up spool 202 is driven at a speed which tends to take up the film 214 at a rate faster than it is given up by the film sprocket 200, frictional slippage means being provided in the take-up spool 202 to prevent the film 214 from tearing. The galvanometer 74 comprises the coil 90 which is disposed, preferably on the axis of inner case 48, in the field of a permanent magnet 216 and which is energized by signals passing through the cable 217 connected to series resistors 80 and 82, shown in FIGS. 2 and 3, and the mirror 92 which is fixedly attached to the coil 90. The galvanometer light source or lamp 98 is energized through leads in cable 218 which are connected to battery 146, illustrated in FIG. 3. The light from lamp 98 is directed by means of a light shield or guard 220 through an opening 221 in frame 188 to a common plane mirror, preferably a front surfaced mirror 222, which reflects the light to the galvanometer mirror 92 where it is reflected back to the front surfaced mirror 222 and then directed through openings 221 and 223 in frame 188, a planoconvex lens 224 attached to frame 188 and the opening or slit 196 in the housing 194 of the camera 78 to the film 214.

Before the geophysical prospecting apparatus of this invention is placed into operation mercury cells which preferably constitute the batteries 104, 146, 132 and 144, that is the power source of the logging equipment, are inserted into the frame 188. The camera 78 which is loaded with film 214 is rigidly attached, while in a light tight bag as necessary to prevent undue exposure of the film 214, to the end of frame 188 so that it is connected to the drive shaft 206 through the clutch 208. To energize the circuits, switches 114 and 150 may be automatically closed when the camera 78 is attached to the frame 188 by suitable means such as a toggle switch connected to a spring biased lever arm which is actuated by the housing 194 of the camera 78 when the camera is attached to the frame 188. Alternatively, switches 114 and 150 may be adapted and arranged to be manually operated at any time after the camera 78 is attached to the frame 188 and inserted into the inner case 48 by providing suitable openings in the inner case 48. As seen in FIGS. 3 and 5 the battery operated constant speed motor 100 is energized by closing switch 114 to drive the film sprocket 200. The instant at which the film 214 begins to move past the housing opening 196 of the camera 78 is noted or recorded. The frame 188 on which is mounted the circuit components and the camera of the electrical logging apparatus is inserted into the inner case 48 and the top plate 52 is secured to the cylinder 50 of the inner case 48 by means of a plurality of set screws. Inner case 48 is then inserted into the capsule 20 and the top cap 24 is secured to the cylinder 22 of the capsule 20. When the top cap 24 is secured to the cylinder 22 the supporting shafts 56 and 58 are snugly held by the thrust bearings 42 and 44 respectively to support the inner case 48 in a manner which will protect the logging equipment, particularly the galvanometers 74, 76 from angular shock, that is from excessive angular acceleration or deceleration, which would unduly vibrate the coils 90 and 94 and the corresponding mirrors 92 and 96 to produce erroneous signals on the film 214. To further protect the galvanometers 74 and 76 the coils 90 and 94 are disposed as close as possible to the axis of the inner case 48 to minimize the effect of centrifugal force thereon in the event of rotation of inner case 48.

With the inner case 48 inserted into the capsule 20 the conventional lower sub 13 to which is connected the bit 12 is attached to the lower special sub 15 and the drill collar 16 is attached to the upper special sub 17. As many additional collars and sections of drill pipe may be added to the drill string as are necessary for conventional drilling operations. Accordingly it can be seen that geophysical prospecting apparatus in accordance with this invention is provided merely by inserting the additional apparatus between the sub 13 and the collar 16 of conventional drilling apparatus.

When the drill string is completely assembled the drill stem 10 may be rotated in the usual manner by an appropriate prime mover, not shown, to operate the drill bit in the usual manner since the housing 14 and the special subs 15 and 17 are designed to withstand forces which are equal to or greater than the rated strength of other sections of a conventional drill stem. Furthermore the mud circulation is not substantially retarded by the additional apparatus since the cross-sectional area of the mud duct between the inner surface of the tubular housing 14 and the external surface of the capsule 20 is equal to or greater than the cross-sectional area of the opening through the conventional drill collar or collars 16.

From the foregoing it is seen that the electrical logging operation may be performed simultaneously with the drilling operation. With the switch 114 in its closed position the motor 100 drives the commutator 110 to produce an alternating current voltage of about 26 cycles per second. This voltage is applied between the common point 62 and the current electrode 68 to pass an alternating current between the current electrode 68 and the drill stem 10 or common point 62 through the borehole 18 in which it is assumed there is a relatively conductive drilling mud and hence through the formations of the earth 19. With current flowing through the formation opposite the housing 14 the potential electrode 84 will detect the voltage differential between the potential electrode 84 and the common point 62, which voltage will vary as a function of the resistivity of the earth's formations, thus to provide the necessary information for producing a resistivity log of an 18" two electrode arrangement. The step-up transformer 122 is used to increase the detected potential between the potential electrode 84 and the common point 62 before it is applied to the bridge rectifier 126 and to isolate unwanted direct current galvanic potentials from the measuring or recording circuit. The direct current voltage at the output of the bridge rectifier 126 is smoothed out by filter 130 before it is applied to the transistor amplifier 128. Coils 90 and 94 of galvanometers 74 and 76 respectively are energized by the unequal voltage across the resistors 80 and 82 in the output circuit of the transistor amplifier 128 to provide galvanometers of different sensitivity so as to produce a clear record of both large and small signal levels. The signal or current variation through the coils 90 and 94 of the galvanometers is indicated by the extent of the deflection of the light beam by the galvanometer mirrors 92 and 96 on the film 214 in the camera 78. The film 214 in the camera 78 is driven by the motor 100 at a slow rate of speed, preferably 1.7 inches per hour. The motor 100 is preferably a constant speed motor operating at about 8,000 revolutions per minute, the gear train 102 which is directly connected to the motor 100 has a gear reduction ratio of about 16,833 to 1 and the worm gear 210 provides a further gear reduction of about 25 to 1 in order to produce the film speed of about 1.7 inches per hour. The batteries 104 and 146 which are composed of mercury cells have an operating life of at least 36 hours and the length of the film 214 is about 60 inches. Consequently, it can be seen that the apparatus of this invention is in continuous operation for a length of time at least equal to the operating life of a rotary drill bit, which is generally about 24 hours.

Each time that the bit is taken out of the hole the drill stem 10 is broken at the joint between the upper special sub 17 and the housing 14. The upper cap 24 is removed from the capsule 20 and the inner case 48 is withdrawn from the capsule 20. The top end-plate 52 is removed from the cylinder 50 of the inner case 48. The frame 188 is withdrawn from the inner case 48, an opaque or light proof bag may be placed over the camera 78 where necessary to prevent undue exposure of the film, the camera 78 is detached from the frame 188 and the cells of the batteries 104 and 146 are removed from the frame 188. The exposed film may then be removed from the camera 78 in a suitable dark room or area and an unexposed film substituted therefor. New cells may replace the used cells which were removed from the frame 188 and the newly loaded camera may again be attached to the frame 188. The logging apparatus may then be assembled in the same manner as described above and another section of the earth 19 may be drilled and simultaneously logged.

Under certain conditions it may be desirable to have a second logging unit including a second frame on which are mounted second circuit components and a second camera to replace the unit withdrawn from the inner case 48, thus one unit may be withdrawn and the other unit immediately substituted therefor. If preferred, a second fully loaded inner case may be provided to replace the spent inner case 48.

When a resistivity log of a borehole is being produced simultaneously with the well drilling operation, that is at a time when the metallic drill string 10 is in the borehole, careful consideration must be given to the insulation between the electrodes and the metallic drill string 10. The insulation must withstand high temperatures, and shock, it must be of high electrical resistance to avoid excessive leakage between the electrodes and the drill string and it must be highly abrasion resistant to avoid the necessity of frequently reapplying the insulation on the drill string. The procedure and the material for constructing an electrode assembly which has been very successfully used in the apparatus of this invention are as follows:

(1) Using a wet lay-up process, wrap a $\frac{1}{16}$ inch layer of glass cloth, having for example, a thickness of 0.011 inch with a resin mixture comprising, by weight, 100 parts epoxy resin, 25 parts curing agent, preferably methylene dianiline, and 125 parts Carborundum, preferably 60 mesh, filler on the housing or pipe 14 which preferably has an 84 inch center section having an outside diameter of 7¼ inches and upper and lower metallic end sections having an outside diameter of 8 inches.

(2) Place a long flat copper strip, preferably about 0.010 inch thick, $\frac{3}{16}$ inch wide and 23 inches long, longitudinally on the $\frac{1}{16}$ inch layer of glass cloth and fasten one end thereof to the current electrode feed-through in the opening 182 of the housing 14.

(3) Wrap a $\frac{1}{16}$ inch layer of glass cloth with the resin mixture from the feed-through at opening 182 of the housing 14 over the first $\frac{1}{16}$ inch layer of glass cloth and the flat copper strip past the location of the first copper screen or potential electrode 84, a distance of approximately 5 inches.

(4) Place a flat copper strip, preferably about 0.010 inch thick, $\frac{3}{8}$ inch wide and 5 inches long over the second $\frac{1}{16}$ inch layer of glass cloth and fasten one end to the potential electrode feed-through in opening 170 of the housing 14.

(5) Wrap a layer of glass cloth with the resin mixture to an outside diameter of approximately 7⅞ inches leaving two 2-inch wide spaces for the two copper screen electrodes.

(6) Solder each of the flat copper strips to the width of the respective 2-inch wide strips of 16 mesh copper screens.

(7) Solder three bare tinned copper wires, each having preferably a 0.025 inch diameter and a 10 inch length about 120° apart to the bottom layer of the copper screens, feed the copper wires through each layer of screen, pull tight and solder to each layer as the screen is wrapped in the 2-inch wide spaces provided in the glass cloth and brush in the resin mixture. Build up the layers of the copper screen to the outside diameter, for example, 8 inches of the upper and lower metallic end sections of housing 14.

(8) Finish wrapping the glass cloth with resin mixture flush with the outside diameter of the screen.

(9) Wrap the glass and copper screens with cellophane tape.

(10) Allow the cellophane wrapped glass and copper screens to stand at room temperature from 12 to 24 hours.

(11) Heat the assembly in an oven to about 300° F. and hold it at that temperature for 6 hours.

(12) Heat it to 350° F. and hold it at that temperature for 2 hours.

(13) Allow it to cool.

(14) Remove the cellophane tape.

Of course it should be understood that before the above described wet lay-up process is used the electrode feedthrough in the openings 170 and 182 of the housing 14 and in the openings 168 and 180 in the capsule 20 should be suitably insulated from the housing 14 and capsule 20 for example by providing an insulated sleeve composed of glass cloth and a resin mixture comprising, by weight, 100 parts epoxy resin, 40 parts asbestos powder and 14½ parts of a curing agent, preferably meta-phenylene diamine.

Accordingly, an electrical logging electrode assembly of greater scrape resistance than heretofore known and which is claimed in a copending application is produced comprising the housing 14 and two external electrodes insulated from each other and from the housing by abrasion resistant insulation material composed of glass cloth wrapped and bonded with, by weight, 100 parts of epoxy resin, 25 parts curing agent, preferably methylene dianiline, and 125 parts Carborundum, preferably 60 mesh, filler to provide electrodes for an electric logging arrangement which may be readily used during well drilling operations.

The galvanometers 74 and 76 have been used very successfully in the logging while drilling apparatus of this invention, however, if desired each of these galvanometers may be replaced by the circuit illustrated in FIG. 6 which has no moving parts. The two input electrodes 226 of this circuit are connected to opposite terminals of one of the two series resistors 80, 82 shown in FIG. 3 and to the base and emitter electrodes of a transistor 228. A collector supply battery 230, a lamp 232, preferably a surgical lamp, and a voltage reducing resistor 234 are serially connected, the resistor 234 also being connected between the collector and emitter electrodes of transistor 228. The collector supply battery 230, the resistor 234, and the lamp 232 are selected such that with no input signal to terminals 226 the lamp 232 will produce a steady light, which light is directed through the plano-convex lens 224 to produce a spot on the film 214 in camera 78 shown in FIG. 5. With constant film speed the spot will produce a straight line of constant intensity. When an input signal appears between the input terminals 226 the current through the lamp 232 will vary in accordance therewith to produce a variation in light intensity which will cause a variation in the intensity of the line recorded on film 214. By use of a conventional photo densimeter or densitometer the intensity of the line on film 214 may be correlated with the signals appearing at the terminals 226.

As indicated hereinabove, a magnetic tape recorder may also be used to record the desired electrical signals from the amplifying and rectifying circuits of the logging equipment. The tape recorder 236, illustrated in FIG. 7, may include one or more recording heads and have two input terminals 238, one of which may be connected to the collector 131 of the transistor 128 shown in FIG. 3 of the drawing and the other to the emitter 129 through the collector supply battery 144.

Accordingly, it can be seen that the invention provides a rugged self-contained logging device which may be readily located in the drill string near the drill bit to log the subsurface formations at a time when there is less mud filtration in the formation than is encountered during conventional electrical logging operations. Although the apparatus of this invention operates under severe requirements of heat and mechanical vibration and shock at the point of drilling, the logging device is so constructed that a sensitive D'Arsonval galanometer may be employed in the recording circuit of the logging system. The embodiment of the invention illustrated in the drawings is an electrical logging while drilling apparatus but it should be understood that one or more sensing devices for the purpose of logging a wide variety of parameters while drilling may be employed, for example, a radiation detector may be disposed in the inner case 48, as described and claimed in copending patent applications of H. E. Hall, Jr., having Serial No. 677,967 and filed August 13, 1957, and A. S. McKay and H. E. Hall, Jr., having Serial No. 677,968 and filed August 13, 1957, which applications issued on January 16, 1962 as U.S. 3,016,960 and U.S. 3,016,961, respectively, in which case the current and potential electrodes, the ring connectors and the insulation on the housing 14 may be eliminated from the apparatus.

As mentioned hereinabove, the film 214 is driven at a constant speed from a noted or recorded starting time so that the amount of film which has passed the opening 196 in the camera 78 is at all times known. In order to determine the depth at which the apparatus is logging at any given time it is only necessary to correlate the depth of the drill bit in the borehole with time. Consequently with this information the deflections recorded on film 214 can be plotted against depth. The depth-time recording device 37 illustrated in FIG. 1 may be of any suitable type but it has been found that convenient devices for correlating the depth in the borehole of the drilling apparatus with time are the well-known Geograph and Rig-Runner which may be used to provide a permanent record of the height of the kelly or traveling block in the derrick against time. This type of depth-time recording device is briefly described on pages 2042–2044 of the Composite Catalog, 22nd Edition, 1957, World Oil, and more fully described in U.S. Patents Nos. Re. 21,297 and 2,287,819. Knowing the amount of travel of the kelly or block with time, the depth of the bit can be determined accurately thus providing sufficient information to readily produce a graph of formation resistivity vs. depth.

Thousands of feet of borehole have been drilled and logged simultaneously with the apparatus illustrated in the figures of the drawings and the logs obtained have compared favorably with logs of the same boreholes which were subsequently produced by similar two electrode arrangements of conventional electrical logging equipment.

Obviously, many modifications and variations of the invention as hereinabove set forth may be made without departing from the spirit and scope thereof and therefore only such limitations should be imposed as are indicated in the appended claims.

We claim:

1. A device for logging a physical characteristic below the surface of the earth while drilling a borehole through the earth's formations, said device comprising a housing adapted to be rigidly attached to apparatus drilling said borehole, a sealed container disposed within and rigidly secured to said housing in such manner as to provide a passage to permit the passage of fluid through said housing, an inner case disposed within said sealed container, means disposed between said inner case and sealed container for isolating said inner case from torsional forces in said sealed container, means disposed within said inner case for continuously receiving indications of values of the physical characteristics and means disposed within said inner case for continuously recording said values.

2. A device as set forth in claim 1 wherein said isolating means is a ball bearing.

3. Apparatus for geophysical prospecting comprising rotatable means for drilling a borehole through the earth's formations, means disposed in the borehole and supported by and affixed to said drilling means for simultaneously receiving an indication of a physical variable below the surface of the earth and means disposed in the borehole and supported by said drilling means for simultaneously recording the indications of the physical variable, a sealed container, at least said recording means being disposed in said sealed container and means for mounting said recording means for free rotation about the rotational axis of said drilling means.

4. Apparatus for geophysical prospecting comprising rotatable means for drilling a borehole through the earth's formations, means disposed in the borehole and supported by said drilling means for simultaneously receiving an indication of a physical variable below the surface of the earth, means disposed in the borehole and supported by said drilling means for simultaneously recording the indications of the physical variable, a sealed container, at least said means for recording the indications of the physical variable being disposed in said sealed container, and means for mounting said means for recording the indications of the physical variable for free rotation about the rotational axis of said drilling means, and means for simultaneously recording the depth at which the indication of the physical variable is being received.

5. Apparatus for geophysical prospecting comprising means for drilling a borehole through the earth's formations, means disposed in the borehole for continuously and simultaneously receiving and recording an indication of a physical characteristic below the surface of the earth and means connected to said receiving and recording means and to said drilling means for supporting said receiving and recording means within said drilling means, said supporting means including means for isolating said receiving and recording means from torsional forces developed during operation of the means for drilling the borehole.

6. Geophysical prospecting apparatus as set forth in claim 5 wherein said supporting means includes a sealed container disposed within and rigidly attached to said drilling means, said sealed container being spaced from said drilling means thereby to define a passageway to permit the passage of fluid through said drilling means and an inner case disposed within said sealed container and further comprising means for mounting said inner case within said container to freely rotate therein about the vertical rotational axis of said drilling means.

7. Geophysical prospecting apparatus as set forth in claim 6 wherein said apparatus further includes resilient shock absorbing means disposed between said receiving and recording means and said inner case.

8. Apparatus for geophysical prospecting comprising a tubular member adapted to be inserted in a rotary drill string, a sealed container disposed within said member and rigidly attached thereto, the cross-sectional areas of said sealed container and said member being such as to provide a fluid passage therebetween, an inner case disposed within said sealed container, a logging device housed in said sealed container and means for isolating said inner case from angular shock due to torsional forces developed during the operation of said rotary drill string.

9. Apparatus for producing an electrical log of a subsurface formation comprising a drill pipe disposed in a borehole in said formation, an instrument container, means for coupling said container to said drill pipe to rotate freely about the longitudinal axis of the drill pipe, means disposed in said container for generating an alternating current, a current electrode disposed without said drill pipe and insulated therefrom, means for connecting said current electrode to said current generating means, a potential electrode disposed without said drill pipe and insulated therefrom, means disposed within said instrument container for recording the voltage difference between said potential electrode and a reference point and means for connecting said potential electrode to said recording means, said connecting means comprising ring connectors.

10. Geophysical prospecting apparatus comprising a rotatable drill stem, a sealed capsule disposed within said stem and rigidly attached thereto, said capsule being adapted and arranged to provide a fluid passage within said drill stem, an inner case, means for mounting said inner case coaxially within said capsule so as to be free to rotate with respect to said capsule, said rotatable drill stem and said freely rotatable inner case having a common axis of rotation, a logging circuit having a terminal disposed within said inner case, an electrode disposed on the outer surface of said drill stem and ring connector means connected at one end thereof to said electrode and at the other end thereof to the terminal of said logging circuit to provide continuous electrical contact between said electrode and said terminal.

11. Geophysical prospecting apparatus comprising a rotatable drill stem, a sealed capsule disposed within said stem and rigidly attached thereto, said capsule being adapted and arranged to provide a fluid passage within said drill stem, a disk disposed within said capsule and rigidly attached thereto, an inner case, means for mounting said inner case coaxially within said capsule so as to be free to rotate with respect to said capsule, said rotatable drill stem and said freely rotatable inner case having a common axis of rotation, a logging circuit having a terminal disposed within said inner case, an electrode disposed on the outer surface of said drill stem and a collector ring connector comprising a collector ring and a brush, said ring being rigidly attached to said inner case and electrically connected to the terminal of said logging circuit, said brush being electrically connected to said electrode and attached to said disk so as to continuously contact said ring, whereby the terminal of said logging circuit is continuously in electrical contact with said electrode.

12. Geophysical prospecting apparatus comprising a drill string including a rotatable drill bit and associated drill stem, a sealed capsule disposed within said stem and rigidly attached thereto, said capsule being mounted in such manner as to provide a fluid passage within said drill stem, a disk disposed within said capsule and rigidly attached thereto, an inner instrument case, means for mounting said inner case coaxially with said capsule so as to be free to rotate with respect to said capsule, a frame adapted to be inserted into said inner instrument case, a logging circuit having a terminal mounted on said frame, an electrode disposed on the outer surface of said drill pipe and ring connector means comprising a slip ring connector having cooperating male and female elements and a collector ring connector having a collector ring element and a brush element in contact with said ring element, one of said slip ring connector elements being attached to said frame, the other of said slip ring connector elements being attached to said inner instrument case, one of said collector ring connector elements being attached to said inner instrument case, the other of said collector ring connector elements being attached to said disk, said electrode, said collector ring connector, said slip ring connector and the terminal of said logging circut being serially connected to provide continuous electrical contact between said electrode and said terminal.

13. Geophysical prospecting apparatus as set forth in claim 12 further comprising cushion means disposed between said frame and said inner case.

14. Method of simultaneously drilling and prospecting a well bore traversing a sub-surface formation that comprises mounting within a rotatable drill stem in the vicinity of the drill bit of the drilling apparatus an elongated sealed capsule containing a housing including means for receiving indications of a physical variable in the formation penetrated by the borehole and recording means for making a record of said indications, rotating the drill stem to actuate the drill bit, isolating and housing from the rotational forces in said drill stem, circulating drilling fluid downwardly through the drill stem including said passage during rotation of the drill stem, continuously measuring said indications and continuously recording a log thereof within said housing as drilling proceeds.

15. Apparatus for geophysical prospecting comprising a tubular member adapted to be inserted in a drill string between the surface of the earth and the drill bit when the drill string is inserted in a bore hole, an instrument case disposed within said member, means defining a fluid passage past said instrument case through said tubular member for the passage of drilling fluid between the surface of the earth and the drill bit, a logging circuit disposed within said instrument case and means for isolating said instrument case from torsional forces in said drill string.

16. Apparatus for geophysical prospecting as set forth in claim 15 wherein said isolating means includes antifriction supporting means coupling said instrument case to said tubular member so as to permit said instrument case to freely rotate about the longitudinal axis of the tubular member.

17. Apparatus for geophysical prospecting as set forth in claim 15 wherein said logging circuit includes a recording device.

18. Apparatus for geophysical prospecting as set forth in claim 17 wherein said recording device is an oscillograph including a galvanometer having a galvanometer coil disposed substantially on the longitudinal axis of the tubular member.

19. Apparatus for geophysical prospecting as set forth in claim 18 wherein said oscillograph comprises a plurality of galvanometers for recording a plurality of traces, each of said galvanometers being disposed substantially on the longitudinal axis of the tubular member and at least one of said galvanometers having a sensitivity different from that of another of said galvanometers.

20. Apparatus for geophysical prospecting as set forth in claim 17 wherein said recording device is a magnetic tape recorder.

21. Apparatus for geophysical prospecting as set forth in claim 17 wherein said recording device is a variable light intensity recording device.

22. A device for logging a physical characteristic below the surface of the earth while drilling a borehole through sub-surface formations, said device comprising a rotatable tubular member adapted to be inserted in apparatus drilling said borehole, an instrument container disposed within said tubular member, means for mounting said instrument container within said tubular member for free rotation about the rotational axis of said tubular member and to permit the passage of fluid through said member and means disposed within said container for receiving indications of said characteristic.

23. Apparatus for geophysical prospecting comprising a tubular member adapted to be inserted in a drill string, an instrument container disposed within said member, means defining a fluid passage past said instrument container through said member, means for attaching said instrument container to said member so as to permit said instrument container to be freely rotatable with respect to said member, a sensing element disposed on said tubular member, means disposed in said instrument container responsive to electrical energy and means for transmitting electrical energy from said sensing element to said responsive means.

24. The method of simultaneously drilling and prospecting a well bore traversing a subsurface formation which comprises mounting within the lower portion of a drill stem of the drilling apparatus a housing containing means for receiving indications of a physical variable in the area of said well bore and rotating said drill stem while isolating said means contained within said housing from rotational forces in said drill stem during the drilling operation by rotating the drill stem to drill the bore hole while permitting the housing to rotate freely with respect to the drill stem.

25. Apparatus for logging an earth formation traversed by a well bore during the course of drilling a well comprising a tubular member comprising a portion of a drill string, a sealed container mounted within said tubular member, said container being spaced from said member in order to provide a passageway for drilling fluid passing through the drill string to the drill bit, a self-contained logging instrument within said container, means for mounting said instrument for substantially free rotation about its vertical axis, relative to said tubular member, said instrument including geophysical measuring apparatus and means for producing a record in response to the output of said measuring apparatus.

26. Apparatus for logging an earth formation traversed by a well bore during the course of drilling a well comprising a tubular member comprising a portion of a drill string, a sealed container mounted within said tubular member, said container being spaced from said member in order to provide a passageway for drilling fluid passing through the drill string to the drill bit, a self-contained logging instrument within said container, means for mounting said instrument for substantially free rotation about its vertical axis relative to said tubular member, said instrument including means for deriving information about the earth formation in the vicinity of the drill bit as the well is drilled.

27. Apparatus for logging an earth formation traversed by a well bore during the course of drilling a well comprising a tubular member comprising a portion of a drill string, a sealed container mounted within said tubular member, a self-contained logging instrument within said container, means for mounting said instrument for free rotation about its vertical axis relative to said tubular member, said instrument including means for geophysical prospecting while drilling.

28. In a system for logging information concerning a physical variable in the vicinity of a rotary drill bit during the course of the actual drilling of a borehole traversing earth formations, the improvement wherein at least a portion of said system includes a logging instrument located in the vicinity of the drill bit and wherein said system includes means for mounting said instrument for substantially free rotation about the rotational axis of said drill bit, whereby torsional forces due to rotational movement of the dril bit during drilling operations are effectively isolated from said logging instrument.

29. In a system for logging information concerning a physical variable in the vicinity of a rotary drill bit attached to a drill string during the course of the actual drilling of a borehole traversing earth formations, the improvement wherein at least a portion of said system includes a sealed capsule rigidly secured to the drill string in the vicinity of the drill bit and a logging instrument contained within said sealed capsule, and wherein said system includes means for mounting said instrument within said capsule for substantially free rotation about the rotational axis of said drill bit, whereby torsional forces due to rotational movement of the drill bit during drilling operations are effectively isolated from said logging instrument.

30. In a system for logging information concerning a physical variable in the vicinity of a drill bit during the course of the actual drilling of a borehole traversing earth formations, said system comprising a rotary drilling apparatus including a drill string having a rotatable drill bit attached thereto, means including the drill string for supplying drilling fluid to the drill bit while operating in a borehole, means for deriving signal information concerning the physical variable in the vicinity of the drill bit during the drilling of the borehole and means for providing a signal display related to said variable in correlation with the location of the observed variable, the improvement wherein at least a portion of said system includes a sealed capsule rigidly secured to the drill string in the vicinity of the drill bit and a logging instrument contained within said sealed capsule, wherein means define a passage for drilling fluid through the drill string past said capsule to the drill bit, and wherein said system includes means for mounting said instrument within said capsule for substantially free rotation about the rotational axis of said drill bit, whereby torsional forces due to rotational movement of the drill bit during drilling operations are effectively isolated from said logging instrument.

References Cited in the file of this patent

UNITED STATES PATENTS

| | | |
|---|---|---|
| 2,116,120 | Malmgren | May 3, 1938 |
| 2,217,090 | Zerbe | Oct. 8, 1940 |
| 2,266,623 | Gurasich | Dec. 16, 1941 |
| 2,349,366 | Moon | May 23, 1944 |
| 2,388,141 | Harrington | Oct. 30, 1945 |
| 2,401,606 | Brown | June 4, 1946 |
| 2,428,034 | Nichols et al. | Sept. 30, 1947 |
| 2,524,031 | Arps | Oct. 3, 1950 |
| 2,629,646 | Warrick | Feb. 24, 1953 |
| 2,650,067 | Martin | Aug. 25, 1953 |
| 2,700,897 | Arps | Feb. 1, 1955 |
| 2,797,976 | Ring | July 2, 1957 |
| 2,840,441 | Owen | June 24, 1958 |
| 2,842,343 | Church et al. | July 8, 1958 |
| 2,890,019 | Arps | June 9, 1959 |

UNITED STATES PATENT OFFICE
CERTIFICATE OF CORRECTION

Patent No. 3,149,683                                            September 22, 1964

Roy J. Clements et al.

It is hereby certified that error appears in the above numbered patent requiring correction and that the said Letters Patent should read as corrected below.

Column 2, line 54, after "on" insert -- the drill pipe; -- column 13, line 14, for "and" read -- said --; column 14, line 59, for "dril" read -- drill --.

Signed and sealed this 20th day of April 1965.

(SEAL)
Attest:

ERNEST W. SWIDER                                        EDWARD J. BRENNER
Attesting Officer                                           Commissioner of Patents